United States Patent [19]
Khokhlov et al.

[11] 3,711,070
[45] Jan. 16, 1973

[54] FOAM-TYPE APPARATUS FOR CARRYING OUT HEAT AND MASS TRANSFER PROCESSES

[75] Inventors: Sergei Fedotovich Khokhlov, Dnepropetrovsk; Viktor Petrovich Yakovin, Severodonetsk; Petr Ivanovich Sysoev, Severodonetsk; Valery Pavlovich Egorov, Severodonetsk, all of U.S.S.R.

[73] Assignee: Severodonetsky Ordena Lenina Khimichesky Kombinat, Severodonetsk Luganskoi Oblasti, U.S.S.R.

[22] Filed: Nov. 14, 1969

[21] Appl. No.: 876,826

[52] U.S. Cl...................261/79 A, 261/114, 261/148, 23/270.5, 159/4, 159/16
[51] Int. Cl. ................................................B05b 7/10
[58] Field of Search.......261/114, 114 A, 114 JP, 114 VT, 261/79 A; 202/158; 252/359.5, 321, 61, 805, 350, 382, 361; 169/1, 2, 14, 15; 203/20; 65/22; 159/DIG. 4

[56] References Cited

UNITED STATES PATENTS

| | | | |
|---|---|---|---|
| 1,670,743 | 5/1928 | Schneible | 261/79 A |
| 1,108,853 | 8/1914 | Sewell | 261/114 X R |
| 1,780,573 | 11/1930 | Wager | 261/79 A X |
| 1,926,116 | 9/1933 | SHeldon | 202/158 X |
| 2,651,512 | 9/1953 | Voleau | 202/158 X |
| 3,070,359 | 12/1962 | Canevari | 202/158 X |
| 3,233,879 | 2/1966 | Mitchell | 267/79 A |
| 3,410,540 | 11/1966 | Bruckert | 261/114 X |

FOREIGN PATENTS OR APPLICATIONS

| | | | |
|---|---|---|---|
| 144,819 | 4/1962 | U.S.S.R. | 202/158 |
| 1,004,597 | 3/1957 | Germany | 261/148 |
| 488,141 | 7/1938 | Great Britain | 202/158 |
| 526,145 | 9/1940 | Great Britain | 261/DIG. 26 |
| 839,695 | 1/1939 | France | 261/114 JP |
| 1,102,876 | 5/1955 | France | 252/359.5 |

*Primary Examiner*—Frank W. Lutter
*Assistant Examiner*—Robert Halper
*Attorney*—Waters, Roditi, Schwartz & Nissen

[57] ABSTRACT

Apparatus for effecting heat and mass transfer processes comprises a vertical array of plate-like members each constituted of a pipe wound in the form of a conical coil with intermediate spaces between the turns thereof. The liquid to be processed flows downwardly through the plate-like members from one plate-like member to the next and the gas to be processed flows upwardly through the spaces between the turns of the coil. A foam is formed on each plate-like member and this foam is distributed to the next lower member via a vertically extending conical member tapering downwardly and projecting into a downwardly tapering conical overflow vessel. The conical member and overflow vessel are disposed just below each plate-like member at the center thereof.

1 Claim, 3 Drawing Figures

FOAM-TYPE APPARATUS FOR CARRYING OUT HEAT AND MASS TRANSFER PROCESSES

The present invention relates to foam-type apparatus for carrying out heat and mass transfer and exchange processes.

One known kind of heat and mass transfer apparatus, wherein reaction is carried out in a foam layer (see "Processes and Apparatus of Chemical Technology" by A.P. Planovski et al., Moscow, 1966, pp. 600–602), comprises a shell having apertured plate-like members mounted thereinside. The process liquid is supplied onto these plate-like members through overflow devices mounted on the plate-like members adjacent to the walls of the shell. On the opposite side of the plate-like member an overflow annular step-like member is disposed. The process liquid flows from the plate-like member onto this step-like member, over the edges of which it spills downwardly onto the next successive plate-like member.

The process gas is supplied into the lowermost portion of the apparatus, wherefrom it flows upwardly at a predetermined rate, passing through the apertures of the plate-like members and cooperating with the process liquid thereon to form a foam layer.

In this known kind of apparatus, liquid is non-uniformly distributed over the surface of the plate-like members, which leads to non-uniformity of the foam layer formed thereon and this adversely affect the efficiency of the process. Besides, should the flow rates of the process liquid and of the process gas be increased, as is essential for intensifying the process, a considerable amount of the liquid will be carried away by the outgoing gas.

It is therefore, an object of the present invention to overcome these disadvantages of the known apparatus.

The present invention seeks to provide an apparatus which ensures uniform distribution of foam liquid over the entire area of the plate-like members, and which reduces the amount of the process liquid carried away by the outgoing gas.

This is attained by an apparatus for carrying out heat and mass transfer processes, comprising a shell having slotted plate-like members mounted thereinside, said apparatus having means for supplying the process liquid onto said plate-like members and means for supplying the process gas into spaces immediately beneath said plate-like members, which apparatus, in accordance with the present invention, further comprises a liquid distributing device disposed above the central portion of each one of said plate-like members, said device including a vertically extending tubular member projecting downwardly into an overflow vessel; and a hydraulic seal for the downflowing liquid, disposed centrally of each one of the plate-like members.

In a preferred embodiment of the present invention said hydraulic seal includes a vertically extending tubular member projecting downwardly into an overflow vessel.

The present invention will be better understood from the following detailed description of an embodiment thereof, with due reference being made to the accompanying drawings, wherein.

Figure 1:
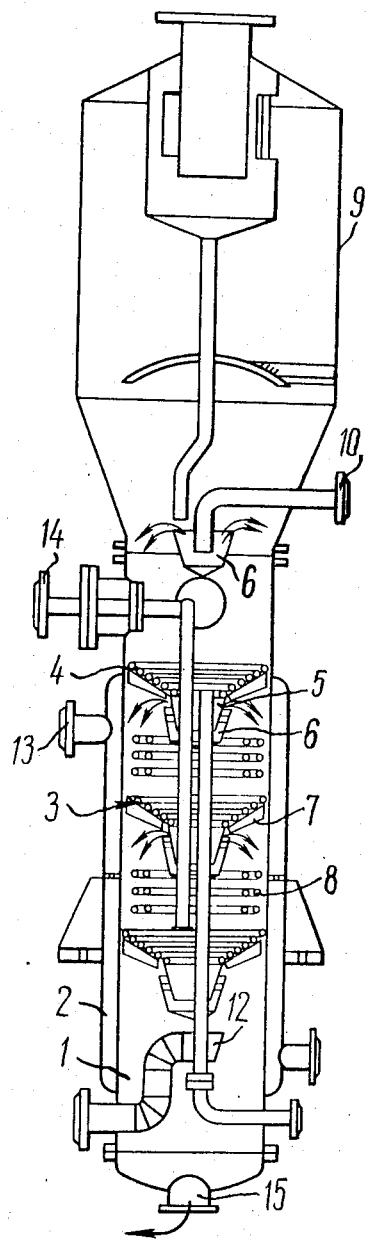
FIG. 1 is a diagrammatic elevational view of a foam-type heat and mass transfer apparatus, embodying the invention.

Referring now to the drawings, a foam-type heat and mass transfer apparatus (FIG. 1) comprises a vertical, cylindrical shell 1 disposed within a steam jacket 2, the shell 1 having mounted thereinside a plurality of vertically spaced plate-like members, or structures 3, each of the plate-like members 3 including a conically coiled tube, with spaces or slots 4 (FIGS. 1 and 2) left between the adjacent turns of this coiled tube for passage of the process gas. Distributing of the process liquid is effected by distributing devices disposed centrally of the shell 1 above each one of the plate-like members 3, each of the distributing devices including a vertically extending tubular member 5 partly projecting downwardly into an open overflow tapered vessel 6, forming a hydraulic seal for the downflowing liquid, which serves at the same time as a liquid distributing device for the plate-like member disposed immediately underneath.

Figure 2:
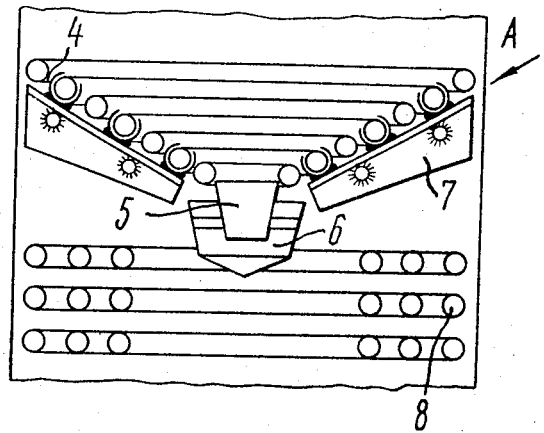
FIG. 2 is an enlarged view of a slotted plate-like member with a liquid distributing device, forming part of the apparatus, embodying the invention.
Figure 3:
FIG. 3 is a view taken in the direction of arrow A in FIG. 2.

The stream of the process gas is diverted and directed by turbulence promoting plates or fins 7 provided under each of the plate-like members 3 and attached thereto as shown in FIG. 2 and disposed at a predetermined angle in relation to the respective plate-like member to extend substantially tangentially to the plate-like members as shown in FIG. 3. Additional coiled tubes 8 are positioned intermediate the adjacent pairs of the plate-like members 3 (FIG. 1). A gas separator 9 is mounted at the top of the apparatus.

The apparatus, embodying the present invention, operates, as follows. Saturated steam or a cooling agent, depending on the requirements of a reaction to be carried out, is supplied under pressure through supply connections 13 and 14 respectively into the steam jacket 2, and into the coiled tubes of the plate-like members 3 and the additional coiled tubes 8. The process liquid is introduced through an inlet connection 10 into the topmost overflow vessel 6, over the top edge of which the liquid spills out and falls in an umbrella-like stream, and in this way it falls onto the peripheral portion of the topmost one of the plate-like members 3. From this peripheral portion the liquid flows down toward the central area of the plate-like member 3, gets into the tubular member 5, fills the overflow vessel 6 and spills over the top edge of this vessel onto the underlying plate-like member 3 (the arrows in FIG. 3 indicate the path of descent of the liquid in the apparatus).

The process gas is introduced into the bottom portion of the apparatus through an inlet connection 12, for the direction of the flow of the gas to be opposite to that of the process liquid.

As the gas and the liquid flow simultaneously through the apparatus with predetermined speeds or rates of flow, a turbulent foam layer is produced on the plate-like members 3.

The turbulence of this layer is further promoted by the turbulence promoting fins 7 provided under each one of the plate-like members 3. The stream of gas, as it meets the fins 7, changes its direction of flow and brings about rotary whirling motion of the foam layer formed on the plate-like members 3.

As a result, a highly developed and rapidly renewed contact surface of the process liquid and the process gas is maintained on the plate-like members, which provides for a highly intensified process of heat and mass transfer.

The stream of gas, as it moves upward from the foam layer, encounters the stream of liquid spilling over the top edge of the overlying overflow vessel 6 at a predetermined rate, whereby the stream of gas is diverted toward the internal walls of the apparatus. This change in the direction of the stream of gas provides for better cleaning of the gas from droplets of the process liquid. This released liquid leaves the internal chamber of the apparatus through an outlet connection 15 disposed at the bottom-most point of the shell 1.

The herein disclosed apparatus can operate with considerably increased hydro-dynamic parameters of the process, as compared with similar apparatus of the prior art. It also provides for increasing by 5–8 times the ratio between the amount of the process liquid and that of the process gas, fed for the reaction. Moreover, an apparatus embodying the present invention provides for the reduction of the proportion of the process liquid carried away by the outgoing gas. Extensive turbulence of the foam layer in the herein disclosed apparatus leads to the increased process-carrying capacity per unit of the volume of the apparatus, which provides for reducing the overall size of the apparatus and for cutting down the time during which the process liquid passes through the apparatus. This last-mentioned feature is particularly essential for the cases of handling thermally unstable solutions, such as is the case of producing highly concentrated melted ammonium nitrate.

What is claimed is:

1. A foam-type apparatus for effecting heat and mass transfer processes, comprising: a shell, a plurality of vertically spaced plate-like members extending transversely inside said shell, each plate-like member comprising a conically coiled tube with intermediate spaces between the turns thereof, means for supplying a liquid to be processed from above onto said plate-like members; means for supplying a gas to be processed into the bottom of the shell for upward flow through the intermediate spaces of each of said plurality of said plate-like members, whereby foam is formed on said plate-like members by interaction of the liquid and gas; rotation-promoting plates attached to said plate-like members and extending downwardly and outwardly thereof to impart whirling motion to the gas; a plurality of devices for distributing the processed liquid from each plate-like member to the next successive lower plate-like member; each of said devices being disposed above a central portion of a respective plate-like member; each of said devices including an overflow vessel which tapers downwardly, and a vertical conduit tapering downwardly and projecting downwardly into said overflow vessel to form a hydraulic seal for the downflowing liquid disposed centrally of each of said plate-like members.

* * * * *